(No Model.) 2 Sheets—Sheet 1.
J. BURNS.
FRUIT CUTTING MACHINE.
No. 484,995. Patented Oct. 25, 1892.
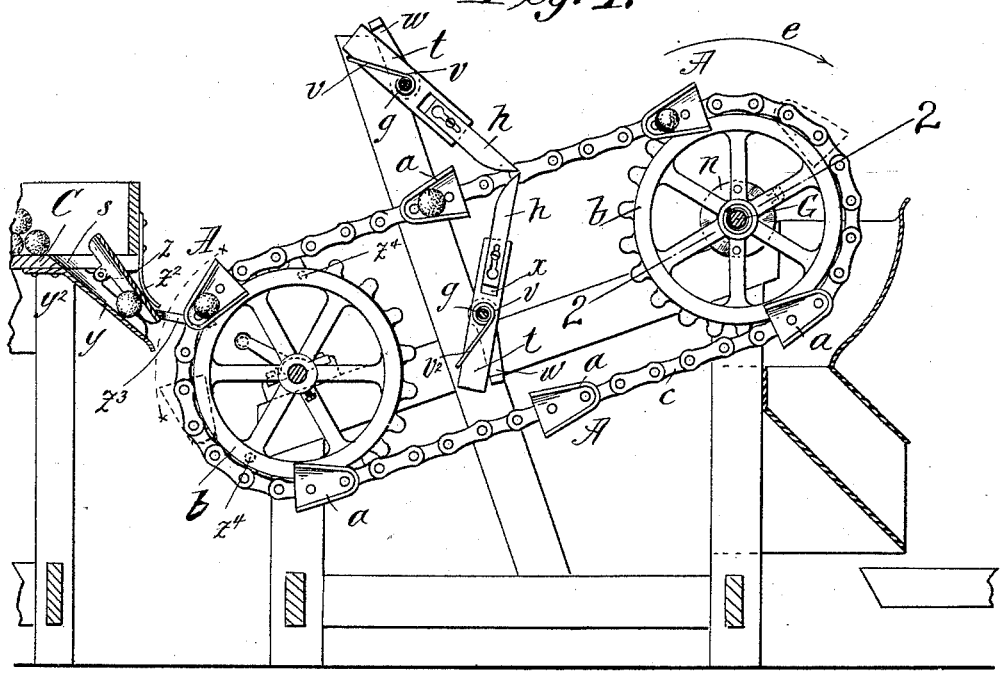
Fig. 1.
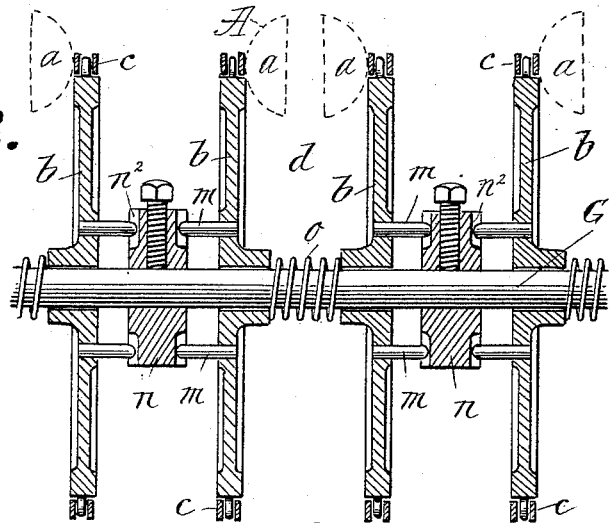
Fig. 2.
Fig. 3.
Witnesses: J. D. Garfield, T. F. Denson
Inventor: John Burns, per Chapin & Co. Att'ys.

(No Model.) 2 Sheets—Sheet 2.
J. BURNS.
FRUIT CUTTING MACHINE.
No. 484,995. Patented Oct. 25, 1892.
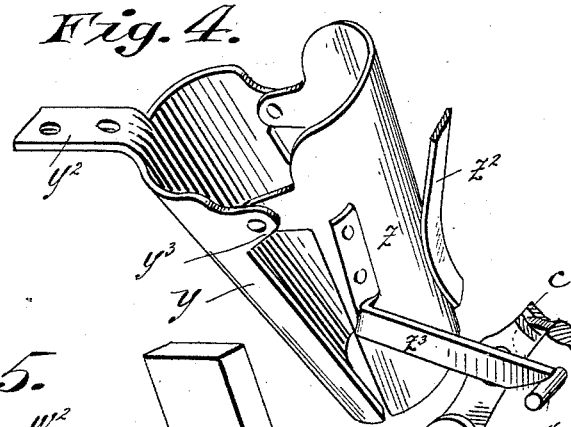
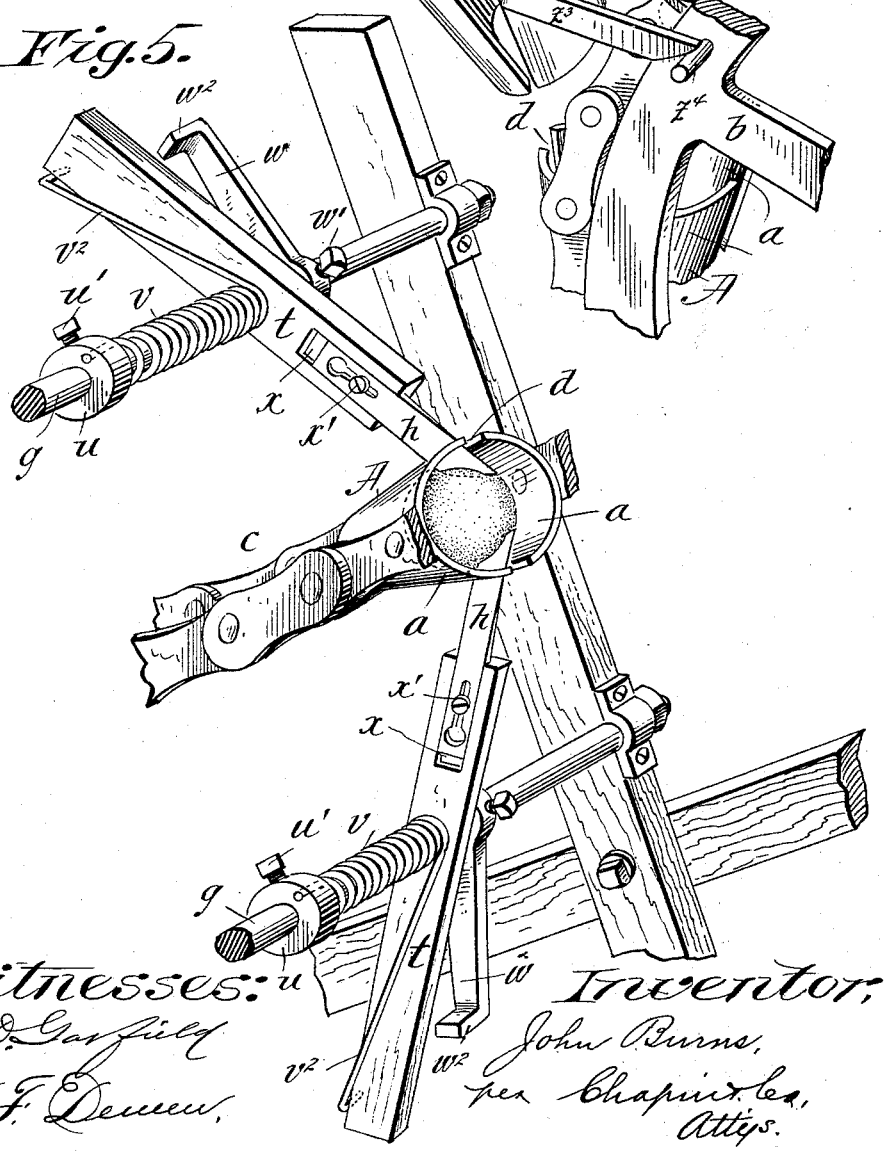

UNITED STATES PATENT OFFICE.

JOHN BURNS, OF LOS ANGELES, CALIFORNIA.

FRUIT-CUTTING MACHINE.

SPECIFICATION forming part of Letters Patent No. 484,995, dated October 25, 1892.

Application filed January 8, 1892. Serial No. 417,341. (No model.)

*To all whom it may concern:*

Be it known that I, JOHN BURNS, a citizen of the United States, residing at Los Angeles, in the county of Los Angeles and State of California, have invented new and useful Improvements in Fruit-Cutting Machines, of which the following is a specification.

This invention relates to improvements in fruit-cutting machines which are more especially designed for work upon fruit having a stone or pit, such as apricots and peaches; and the invention more especially relates to improvements on the fruit-cutting machine which forms the subject-matter patented to me January 5, 1892, No. 466,453.

The fruit-cutting machine to which the present improvements are applicable and as set forth in the aforesaid application comprises a series of separated conveyer-cups and chain-carriers therefor, with knives located in the plane of separation between the cups, which are spring-pressed, whereby they are normally maintained in positions for a cutting impingement upon the fruit carried by the conveyer-cups and adapted to recede from the normal position when their edges contact with the pit of the fruit. In the said machine the peaches or apricots are placed in the conveyer-cups of the several series thereof which are comprised in the machine by hand as the cups respectively pass the work-table, which forms a part of the machine. The said fruit after having been cut is then delivered from the conveyer-cups on the overturning thereof to be received into a proper receptacle therefor.

The present invention more particularly pertains to an automatic hopper provided for and arranged in relation to each of the series of conveyer-cups, into which the fruit to be cut may be placed in readiness for delivery at the time of arrival thereunder of the traveling conveyer-cup and means for effecting at the proper time the opening of the hopper for the delivery of the peach or apricot in the hopper to the cup, to improved devices in and relative to the fruit-cutting knives, and in the arrangement of the cups relative to their carriers, all whereby the knives are more readily adjustable for their operative presentation relative to the moving fruit for the cutting action thereon, and most a effective degree of pressure upon the knives may be had in accordance with the size and nature of the fruit substance to be cut, and whereby the desired effective results are as well and automatically insured upon fruit of one size as another.

The invention also pertains to the mounting and controlling of the supports for the conveyer-cups, whereby after the fruit has been cut a further separation of the cup-shells will be effected and greater freedom of discharge permitted.

The invention, to these ends, consists in constructions and combinations of parts, all substantially as will hereinafter more fully appear, and be set forth in the claims.

In the accompanying drawings, Figure 1 is a sectional elevation of the fruit-cutting machine, showing the embodiment therein of the present improvements. Fig. 2 is an enlarged sectional view on line 2 2, Fig. 1. Fig. 3 is a detail view, in perspective, to be hereinafter referred to. Fig. 4 is a perspective view of the improved hopper in conjunction with one of the conveyer-cups and its carrier. Fig. 5 is a perspective view illustrating the construction of the cutters shown as in their operative relations with a conveyer-cup.

In the drawings, A A represent the receptacle-conveyers for the individual fruit, the same consisting of bell or cup shaped devices having coincident with the axes thereof a slot or opening $d$, and each half-section $a$, which is completely separated by and is at one side of the slot or opening, is fixed upon and supported by a sprocket-chain $c$, the several chains for the several series of half-cups being mounted on sprocket-wheels $b\,b$ therefor, the latter receiving rotary motion by any adequate means.

Separated shells successively mounted on a pair of parallel chains have their separating spaces or slots $d$ in a common vertical plane, which is coincident with the direction of travel of the chain, and each of the cup-receivers has its flaring mouth upwardly and forwardly extended, as indicated in Fig. 1, the arrow $e$ indicating the direction of travel. There is a pair of knives or cutters $h\,h$ for each set or series of the fruit-conveyer cups, the same being by their holders intermediately pivoted on the supporting-rods $g$, and said knives are inclined the one downwardly and forwardly and the other upwardly and forwardly, the points of the blades terminating in proximity, substantially as shown, the blades being in the plane of the separating-cleft of the conveyer-shells.

In accordance with the present improvements the knife-blades $h$ are carried on the holder-bars $t$, which intermediately thereof are pivotally mounted on the transverse supporting-rod $g$. This supporting-rod is understood as fixed against any bodily or rotational movement, the knife-holder bar $t$ being intermediately drilled to fit upon the rod and to have a swinging movement thereon.

$u$, Fig. 5, represents a collar which fits the rod at a short distance from the cutter-bar, being held against rotational movement by the set-screw $u'$. The spiral spring $v$ encircles the rod, one end thereof being secured to the said collar $u$, and the other is extended radially from the rod, as at $v^2$, and has an engagement with the knife-holder $t$. These springs by their applications upon and relative to the supporting-rods $g$ $g$ and the pair of knife-holder bars constrain the knives to be normally swung with their blade-edges at the points in proximity, the swinging movements of the knives into such positions being limited by the dog $w$ for each knife-holder. Each of said dogs consists of an apertured shank, which is set by the screw $w'$, fixed upon the shaft, and the angularly-turned outer end $w^2$, which is projected across the plane of swinging movement of the knife-holder $t$. By turning the dog $w$ so that it may have a slightly-different radial position on the supporting-rod $g$ the degree of proximity for the knife-points may be regulated. On desiring to modify the spring-pressure exerted upon the knives such may be done by loosening the set-screw for the collars $u$ and then sliding and turning the collars to secure a greater or less compression of the spring, after which the collars are reset.

The knife-holders $t$ have at their forward end portions and within their sides shallow grooves $x$, corresponding to the width of the knife-blades, into which the slotted knife-blades are placed, being secured by the set-screws $x'$. The adjustment of the knives the one relative to the other may thus be nicely made, as permitted, both by the limitation, as desired, by means of the dogs $w$, by the inward swinging movement of the knives, and by the longitudinal adjustment thereof on their respective holders.

C represents the work-table, located as a rear end part of the machine, the same being for the support of the fruit to be cut, and from which the same is to be entered, one by one, into the cup-carriers as they respectively pass the edge of the table.

As fully set forth in my aforesaid application, there are to be several—for instance, four to six—pairs of carrying-chains and as many series of the cleft cup-carriers thereon; and it is the purpose of the present invention to provide adjacent the course of travel of each of the series of cup-carriers hopper devices, into which the fruit may be placed, one by one, at a suitable time previous to the arrival adjacent thereto of a carrier-cup, the hoppers being automatically operative at the proper time to deliver the fruit therefrom into the conveyer. At and under the forward portion of the work-table C and at a point thereof coincident with the plane of travel of each series of the carrier-cups one of these automatic hoppers is placed.

The construction of the hopper is substantially illustrated in Figs. 1 and 2, and consists of a pair of jaws $y$ and $z$, which together constitute a funnel-shaped receptacle that is open at both ends, the flaring end being uppermost, and the axis of the said hopper is downwardly and forwardly inclined. These hoppers may be constructed of thin metal, and the fixed member or jaw thereof may have the lug $y^2$, through which to secure it to the under side of the work-table, near the aperture $s$ or at the forward edge of the table. The fixed member $y$ has the ear-pieces $y^3$, and the movable jaw $z$ also has ear-pieces, the ear-pieces of the one jaw being pivotally connected to those of the other. The movable jaw has applied in relation thereto the spring $z^2$ for securing the closure thereof after the same has been opened for the delivery of the fruit by the means which will be now described.

Tappets or wipers are to be provided on a suitable rotatable part of the machine, which are timed to operate to open the hoppers successively as the carrier-cups are brought into position to receive the fruit which have been placed therein therefrom. Various appliances may be provided for this purpose; but the simple means consisting of the arms $z^3$ on each movable hopper-jaw and the wiper-studs $z^4$ on the rear sprocket-carrying wheels $b$ effectively serve the purpose.

It will be understood that in a machine substantially of the character herein contemplated, where there are embodied a half a dozen series of chain-carried cups and single ones of all of the series simultaneously coming into proximity to the work or supply table, a single attendant finds it practically impossible to properly deposit a peach or apricot in each of the six passing carriers, and yet he will have a comparatively-considerable interval of idleness before the presentment of the next several carrier-cups.

By having the several automatically-opening hoppers, substantially as herein set forth, the attendant may leisurely place the individual fruit therein from time to time as the previously-deposited fruit may have been delivered and as required to be replaced, such person having no concern as to the position of the carrier-cup.

It will be noted on an inspection of Fig. 1 that the sprocket-wheels at one end of the machine for the cup-shells are mounted higher than the sprocket-wheels at the other end, and therefore the chain has an upward and forward inclination, which is coincident with the axis of the conveyer-cup. It will therefore be seen that larger fruit supported in the conveyer-cup toward its mouth or smaller fruit settled well within the contracted portion of the cup will have equal portions of its pit or stone at each side of the coinciding cup-axis and line of travel, and it will be further noted in said Fig. 1 that the cutters $h$ $h$ are located at corresponding distances from the said plane of travel of the chain and cup-axis and will separate equally from said plane to have as hard a bearing and cutting action upon the fruit and relative to the stone thereof on the one side of the latter as upon the other. The higher pairs of sprocket-wheels, around the forward face of which the conveyer-cups overturn for the discharge of the already-cut fruit therefrom, are loosely mounted on the supporting-shaft $G$ therefor and have means coacting therewith for increasing the distance of separation between them, whereby the chain-carried half-cups will also become further separated and whereby, therefore, the greater freedom of the fruit-discharge will be assured.

The sprocket-wheels, as shown in Fig. 2, are loose on the shaft, and the sprocket-wheels of each pair have studs $m$ $m$ projecting laterally from their faces and in bearing upon the collars $n$ $n$, which are fixed upon the shaft $G$. The faces of the collars on which said studs bear are cam-formed, as indicated at $n^2$, the most prominent portions of the collar-bearing faces tending to keep the sprocket-wheels sufficiently together against the reaction of the spring $o$, leaving the cleft between the half-cups merely sufficient for their free passage by and at either side of the knives; but periodically and at such times as a cup is overturning for delivery the abated cam portions permit the sprocket-carrying wheels to spread from each other, forced by the spring $o$, to be, however, quickly forced to the normal proximity.

Having thus described my invention, what I claim, and desire to secure by Letters Patent, is—

1. In a fruit-cutting machine, the combination, with a movable receptacle adapted to receive and convey the fruit to the cutting mechanism, of a hopper located adjacent to the course of travel of said receptacle and having a movable section, and mechanism for moving said section periodically for permitting the delivery of fruit from the hopper into the conveyer-receptacle, substantially as and for the purpose set forth.

2. In a fruit-cutting machine, the combination, with a carrier-receptacle adapted to receive and convey the fruit to the cutting mechanism, of a hopper located adjacent to the course of travel of the carrier and having a fixed jaw and a movable jaw, the latter being provided with an abutment portion or member, and a rotatable part of the machine having a concurrent movement with the carrier and provided with a tappet or contacting-piece for periodically effecting the operation of the movable hopper-jaw, substantially as described.

3. In a fruit-cutting machine, the combination, with the work-table and the carrier-chains having the receptacle-cups and the sprocket-wheels on which said chains are carried, and certain of said wheels being provided with the tappet-pins $z^4$, of the fixed hopper-jaw $y$, secured at the forward under portion of the table and downwardly and forwardly inclined, and the movable jaw $z$, pivoted thereon and provided with the abutment arm $z^3$ and the spring $z^2$, substantially as described.

4. In a fruit-cutting machine, the combination, with the separated carrier-chains and the separated cup-shells thereon, substantially as described, of the rods $g$ $g$, ranging across said chains at either side of their course of travel and having cutter-holders mounted thereon to swing independently thereof, springs applied upon and relative to said rods and said knife-holders for securing a maintenance of the knives in positions adjacent to each other and permitting their separation against said springs, and the dogs $w$ $w$, adjustably mounted on the said rods adjacent to the knife-holders and having portions against which the holders abut, whereby the approach of the knives may be limited, for the purposes set forth.

5. In a fruit-cutting machine, the combination, with the separated carrier-chains and the separated cup-shells thereon, substantially as described, of the fixed cross-rods $g$ $g$ and the knife-holders $t$ $t$ thereon and each carrying the cutting-blade $h$, the dogs $w$, having the angularly-turned extremities $w^2$, and the set-screws $w'$ for adjustably fixing said dogs on the rods, the collars $u$ and the set-screws for fixing them on the rods, and the coil-springs $v$, encircling said rods and each having its one end fixed to one of said collars $u$ and having its other extremity in engagement with one of the knife-holders, substantially as and for the purposes described.

6. In a fruit-cutting machine, the combination, with a pair of separated shells to constitute a split forwardly and upwardly flaring conveyer-cup, and carriers therefor mounted to travel in an inclined plane coincident with the axis or common median line of the conveyer-cups, of cutters mounted for presentation at the cleft between the shells and at corresponding distances from the said plane of travel, substantially as and for the purposes set forth.

7. In a fruit-cutting machine, a pair of separated shells or sections which together conduce to form cups, carriers therefor having uniform movements, the said shells being arranged on their carriers with their mouths forwardly disposed relative to their direction of travel, and one or more cutters located in the plane of the split between the cups, in combination with mechanism for periodically further separating the one shell from the other, for the purpose set forth.

8. In a fruit-cutting machine, a series of paired separated shells which together conduce to form a series of cleft fruit-holder cups, and chains on which the cut sections are mounted at corresponding intervals, supporting and drive wheels around which the chains are mounted, the wheel of one opposing pair being loosely mounted on its shaft, a spring applied for effecting the further separation of the one wheel from the other, a member mounted adjacent a part of the movably-mounted wheel, having an abated portion for permitting of the further separation and a prominent portion to restore the wheel to its normal degree of proximity to its fellow, and a cutting device mounted for presentation at the cleft between the shells, substantially as and for the purposes set forth.

9. In a fruit-cutting machine, the combination, with the separated carrier-chains and the separated cup-shells thereon, substantially as described, of the fixed cross-rods $g\ g$, and the knife-holders $t\ t$, mounted thereon for a swinging movement and each having in its side the groove $x$, the cutting-blades $h\ h$, fitted in said side grooves and having slotted shanks, and the set-screws $x'$, the dogs $w$, having the angular extremities $w^2$ and the set-screws $w'$ therefor, the collars $u$ and the set-screws $u'$ therefor, and the coiled springs $v$, encircling said rods $g$, and each having its one extremity connected to one of the collars $u$ and its other in engagement with one of said knife-holders, as and for the purposes set forth.

JOHN BURNS.

Witnesses:
R. A. MARSHALL,
J. J. O'NEILL.